United States Patent [19]

Cathers et al.

[11] Patent Number: 4,756,735
[45] Date of Patent: Jul. 12, 1988

[54] IN-LEHR PRESS BENDING

[75] Inventors: William P. Cathers, Shaler Township, Allegheny County; Thomas J. Reese, Buffalo Township, Butler County; Richard B. Weiss, Lower Burrel, all of Pa.

[73] Assignee: PPG Industries, Inc., Pittsburgh, Pa.

[21] Appl. No.: 77,152

[22] Filed: Jul. 24, 1987

[51] Int. Cl.⁴ .......................................... C03B 23/023
[52] U.S. Cl. ...................................... 65/106; 65/107; 65/273; 65/289; 65/290
[58] Field of Search ................. 65/106, 107, 273, 289, 65/290

[56] References Cited

U.S. PATENT DOCUMENTS

| | | |
|---|---|---|
| 2,131,873 | 10/1938 | Goodwillie . |
| 2,442,242 | 5/1948 | Lewis . |
| 2,570,309 | 10/1951 | Black . |
| 3,068,672 | 12/1962 | Black . |
| 3,208,839 | 9/1965 | Nordberg . |
| 3,408,173 | 10/1968 | Leflet, Jr. . |
| 3,476,540 | 11/1969 | Ritter, Jr. et al. . |
| 3,554,724 | 1/1971 | Ritter, Jr. et al. . |
| 3,573,889 | 4/1971 | McMaster et al. . |
| 3,713,799 | 1/1973 | McMaster ........................ 65/289 X |
| 3,904,460 | 9/1975 | Comperatore . |
| 3,976,462 | 8/1976 | Sutara . |
| 4,260,408 | 4/1981 | Reese et al. . |
| 4,260,409 | 4/1981 | Reese et al. . |
| 4,265,650 | 5/1981 | Reese et al. . |
| 4,272,275 | 6/1981 | Reese . |
| 4,290,796 | 9/1981 | Reese et al. . |
| 4,526,605 | 7/1985 | Frank et al. . |
| 4,579,577 | 4/1986 | Claassen . |
| 4,597,789 | 7/1986 | Reese . |
| 4,711,654 | 12/1987 | Iida ................................... 65/106 X |

Primary Examiner—Arthur Kellogg
Attorney, Agent, or Firm—Andrew C. Siminerio

[57] ABSTRACT

Glass sheets are positioned on the shaping rail of an outline shaping mold for movement through a heating lehr and subsequent preliminary sag bending. The mold with the glass sheet supported thereon is then positioned between a pair of vertically aligned full surface pressing molds. The mold includes selected press surface areas that extend outside the perimeter of the outline mold. As the lower mold raises to lift the glass sheet off the outline mold, selected portions of the shaping rail move outwardly to allow the lower mold to pass through the outline mold. The glass sheet is then pressed between the upper and lower pressing molds.

22 Claims, 5 Drawing Sheets

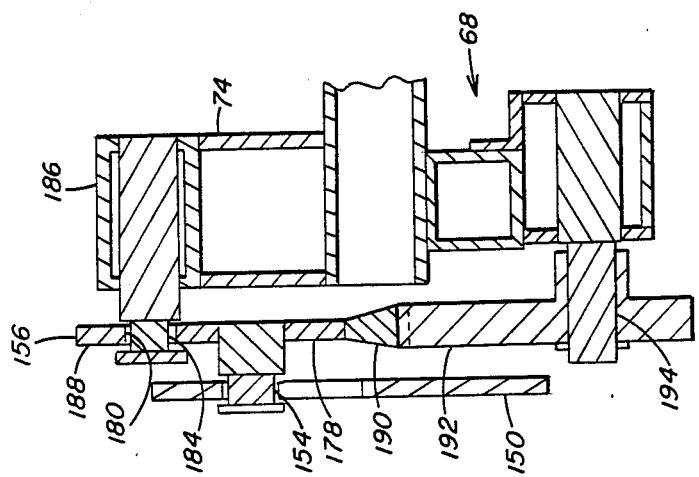
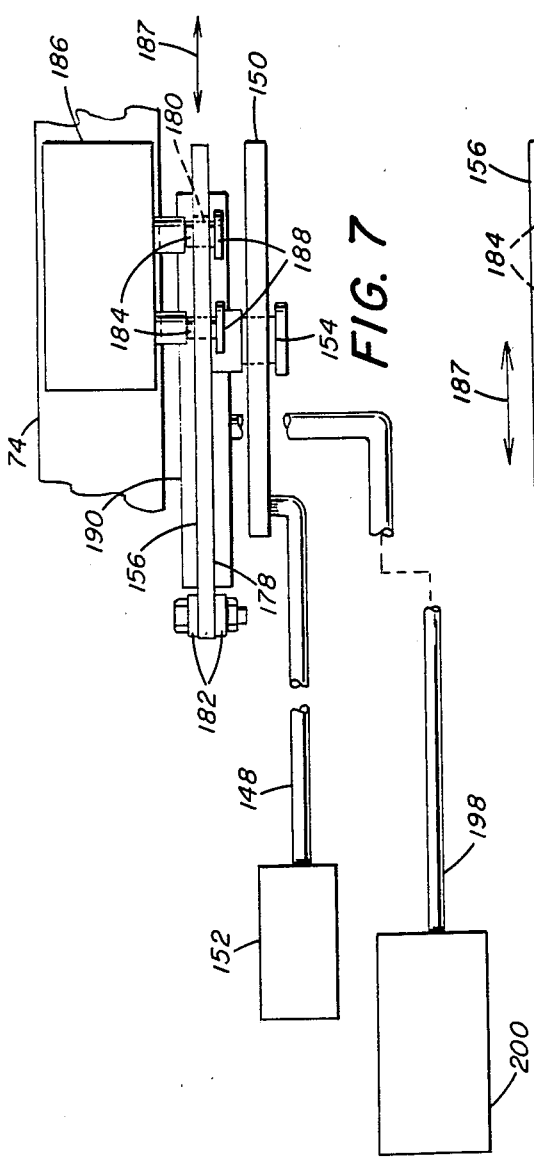
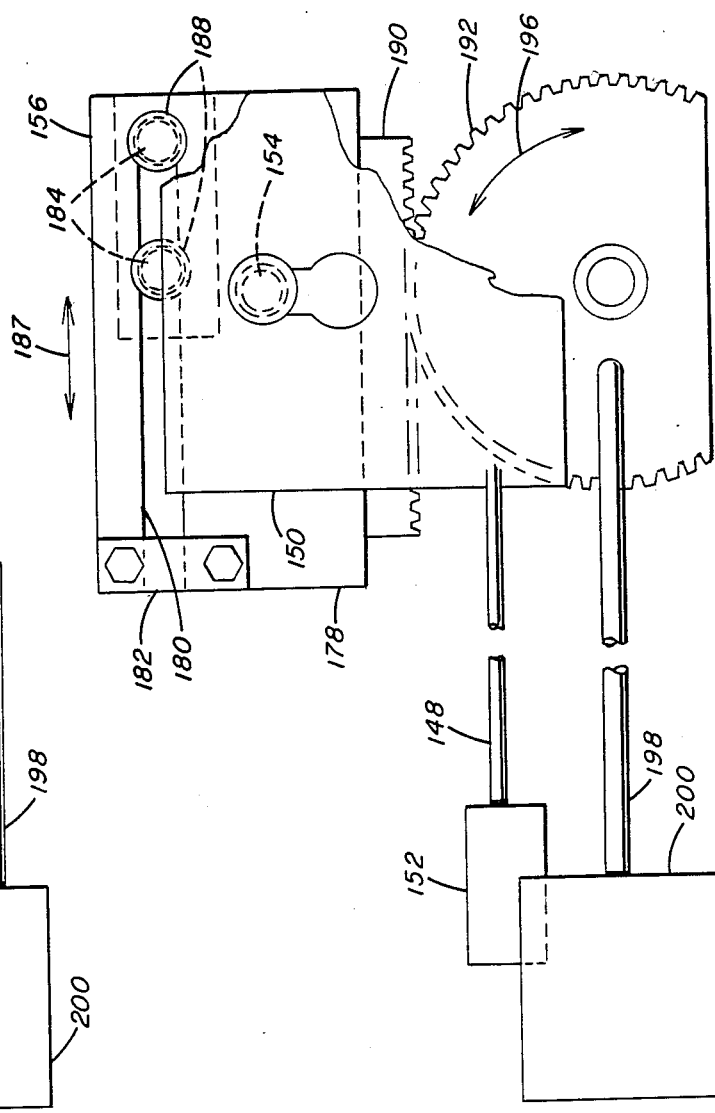

IN-LEHR PRESS BENDING

BACKGROUND OF THE INVENTION

1. Field of the Invention

This invention relates to shaping heat softened glass sheets, and in particular, to shaping pairs of glass sheets to a nonuniform curved configuration by combination of preliminary gravity sag bending on a ring-type outline mold, and final press bending between a pair of vertically aligned full surface press faces.

2. Technical Consideration

One common technique for shaping a glass sheet is to support the sheet on an outline bending mold having a shaping rail with an upper surface having elevational contours corresponding to the final desired shape of the glass sheet. The glass sheet is heated to its heat softened temperature and sags by gravity to assume the desired configuration. This technique is particularly well suited for simultaneously shaping two sheets of glass, or doublets, that will be used as the inner and outer plies of conventional laminated glass, for example a windshield.

As the glass sheet configurations become more complex and include deeper bend sections, the shaping rails may be segmented and made to pivot from an open rigid glass sheet supporting position to a closed heat softened glass sheet supporting position. In the closed position, the shaping rails assumed the desired elevational contours of the glass sheet to be shaped slightly inboard of its perimeter.

In addition, pressing molds may be used to shape glass doublets to complex and complicated configurations by pressing the glass sheets batween a pair of aligned full surface press faces. When pressing molds are used in conjunction with an outline mold, the lower mold generally moves upward through the rail of the outline mold, lifting the glass sheet off of the outline mold and pressing it against a complementing upper mold. Since the shaping surface of the lower mold must move through the outline mold, only those portions of the glass within the boundary of the outline mold are pressed. The circumferential area of the glass sheet contacts only the upper press face of the mold. As a result, the glass sheets are not pressed to shape out to their peripheral edge.

It would be advantageous to provide a bending arrangement wherein glass sheets can be preliminarily shaped on an outline bending mold and pressed between a pair of full surface bending molds to impart a final configuration wherein the full surface molds press the glass sheets along selected peripheral areas.

Patents of Interest

U.S. Pat. No. 2,131,873 to Goodwillie shapes one or a pair of glass sheets by supporting the glass sheets on an upwardly facing concave shaping surface of a solid lower mold, allowing the glass sheets to sag by gravity to conform to the shaping surface, and pressing the sheets between the lower mold and an upper solid mold with a complementary convex shaping surface. The glass sheets remain on the lower mold throughout the sagging and press bending operation.

U.S. Pat. No. 2,442,242 to Lewis heats flat glass sheets having a straight leading edge while supported on flat strips until the leading edge engages a straight rib. A pair of heated molds having complementary shaping surfaces, sandwich the hot glass to impress a cylindrical shape thereon. The patent is limited in its application to sheets having a straight edge.

U.S. Pat. No. 2,570,309 to Black sag bends a glass sheet by heating it while supporting the sheet on an outline ring-type mold to conform to the mold by gravity sagging. The gravity sagged glass sheet is then lifted on a lower solid pressing mold of concave elevation into pressing engagement against an upper solid pressing mold of complementary shape. The lower mold does not engage and press the outer peripheral areas of the glass sheet against the upper mold. The bent glass sheet is returned to the outline ring-type mold to support the bent glass sheet during quenching.

U.S. Pat. Nos. 3,068,672 to Black; 3,408,173 to Leflet; 3,976,462 to Sutara; and 4,687,501 to Reese disclose outline metal molds for shaping a glass sheet of non-rectangular outline to a nonuniform shape by gravity sag bending. Black, Sutara and Reese each further disclose a sectionalized outline metal mold for the gravity sag bending. No means is provided in any patent to correct the uncontrolled sag in the unsupported regions of the shaped glass sheet.

U.S. Pat. No. 3,208,839 to Nordberg press bends as many as three glass sheets to conforming shapes simultaneously using press bending techniques exclusively for the shaping process.

U.S. Pat. No. 3,476,540 Ritter, et al. shapes individual glass sheets conveyed on rollers to a shaping station where each sheet in turn is lifted sufficiently rapidly by a outline mold consisting of plurality of shaped bars to shape the glass by the so called inertia gravity bending method.

U.S. Pat. No. 3,554,724 to Ritter et al. combines the inertia gravity bending method of the previous patent with peripheral engagement against a supplemental shaping surface constructed and arranged to be contacted by the upper surface of the glass sheet when the latter is lifted. Neither of the these last two patents contain any provision for correcting unwanted sag within the supported margin.

U.S. Pat. No. 3,573,889 to McMaster et al. discloses a method of fabricating a shaped laminated windshield of tempered glass comprising press bending horizontally deposed glass sheets individually between upper and lower pressing molds. This process is limited to fabricating laminates of relatively simple gentle curvature containing glass sheets so thin they must be capable of flexing. In addition, the process is inefficient as each glass sheet is shaped individually.

U.S. Pat. No. 3,904,460 to Comperatore individually press bends a pair of glass sheets to slightly different configurations as required for the inner and outer glass plies of a curve laminated windshield for automobiles. The need to press bend the plies separately from each other before laminating provides an operation where efficiency could be improved.

U.S. Pat. Nos. 4,260,408, 4,260,409, 4,265,650 and 4,290,796 to Reese et al. and 4,272,275 to Reese disclose the simultaneous shaping of a pair of glass sheets having a non-rectangularly outline of nonuniform curvature in plan by combination of gravity sag bending and press bending to a complicated shape including a longitudinal bend about a transverse axis of curvature and a complicated bend containing both convex and concave elements and elevation about a transverse axis. The bending of such a shape requires precise alignment between the glass sheets and the molds used to impart the different components of the complicated bend.

SUMMARY OF THE INVENTION

An object of the present invention is to provide an outline bending mold for shaping heat softened sheet material. The bending mold includes first and second rail portions positioned on a support frame, having an elevational contour to support corresponding first and second portions of the sheet inboard of the sheet perimeter and an arrangement to move the second rail portion horizontally along the frame relative to the first rail portion from a first position wherein the second rail portion is inboard of the sheet perimeter to a second position wherein the second rail portion is outboard of the sheet perimeter. The outline mold may be an articulating outline mold with the second rail portion being pivotally mounted on the frame relative to the first rail portion.

Another object of the invention is to provide an apparatus for shaping a sheet of material to a predetermined shape. The apparatus includes an outline sheet supporting mold having first and second rail portions with sheet engaging surfaces corresponding to the desired shape and elevational contour of the sheet inboard of the sheet perimeter. The rail is mounted such that the first and second rail portions may separate. A lower shaping mold having a full surface press face with a press face outline having a first portion slightly smaller than a plan outline of the outline mold and selected second portions extending beyond the plan outline of the outline mold is positioned below the outline mold and is vertically moveable relative to the outline mold so as to move through the separated outline mold. In one particular embodiment of the invention, the selected second portions of the press face outline extend at least to the perimeter of the sheet to be shaped. The separating action of the outline mold is actuated by the vertical movement of the lower mold. The outline mold may be aligned between the lower mold and an upper shaping mold having a pressing surface complementing the pressing surface of said lower mold.

A further object of the invention is to provide a method of shaping heat softenable sheet material. The sheet is positioned on the shaping rail of an outline mold and heated to its heat softening temperature so as to allow the sheet to gravity sag into substantial conformance with shaping surface of the outline mold. The mold is then positioned above a shaping mold with a full surface press face having a first outline portion slightly smaller than the plan outline of the outline mold and selected second outline portions extending beyond the plan outline of the outline mold. The outline mold is expanded by moving selected portions of the shaping rail that are vertically aligned with the selected second outline portions of the shaping mold outwardly relative to the outline mold. The shaping mold is then raised relative to the outline mold such that the shaping mold press face passes through the expanded shaping rail to lift the sheet from the shaping rail and shape the sheet. After shaping, the shaping mold is lowered through the outline mold. The selected portions of the shaping rail are moved inwardly relative to the outline mold such that the outline mold assumes its original configuration and the shaped sheet is supported by the shaping rail.

In one particular embodiment of the invention the sheet is pressed between the lower mold and a vertically aligned full surface upper mold. In addition, a vacuum may be drawn through the upper shaping mold to hold the sheet thereagainst while lowering the lower shaping mold through said outline mold. The vacuum is then terminated to deposit the shaped glass sheet on the shaping rail of the outline mold.

BRIEF DESCRIPTION OF THE DRAWING

FIG. 1, comprising FIG. 1a shows the upstream portion and FIG. 1b shows the downstream portion, with certain portions omitted for clarity.

FIG. 6 is a front elevation of the mechanism shown in FIG. 5.

FIG. 7 is a top view of the mechanism shown in FIG. 5.

FIG. 8 is a side view of the mechanism shown in FIG. 5.

DETAILED DESCRIPTION OF THE INVENTION

The present invention relates to shaping heat softened glass sheets but it is understood that the invention may be used to shape any heat softenable sheet material where it is critical that selected edge portions of the sheet must be precisely and accurately shaped.

Figure 1A:
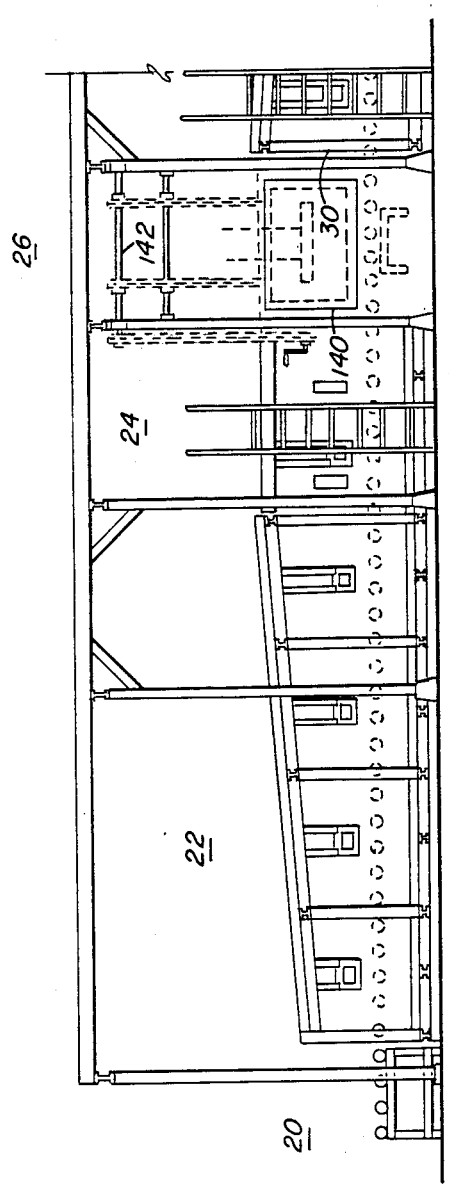
FIG. 1a and FIG. 1b, is a longitudinal side view of a glass sheet bending lehr arrangement in accordance with the present invention.
Figure 1B:
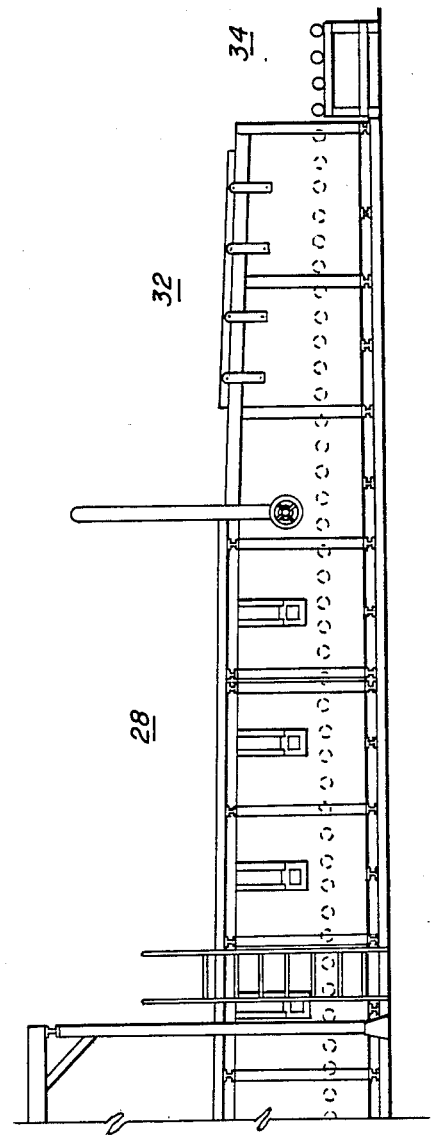

In the drawings FIGS. 1a and 1b depict a heating, shaping and annealing lehr for shaping glass sheets according to the present invention. The lehr begins downstream at a loading zone 20 and includes a heating zone 22 of tunnel type configuration, a gravity bending zone 24 downstream of the heating zone 22, a press bending or shaping station 26 immediately beyond the gravity bending zone 24, an annealing zone 28 which may include a door 30 beyond the shaping station 26 and a cooling zone 32 in end to end relation in a downstream portion of the lehr. An unloading zone 34 is beyond the cooling zone 32.

Figure 2:
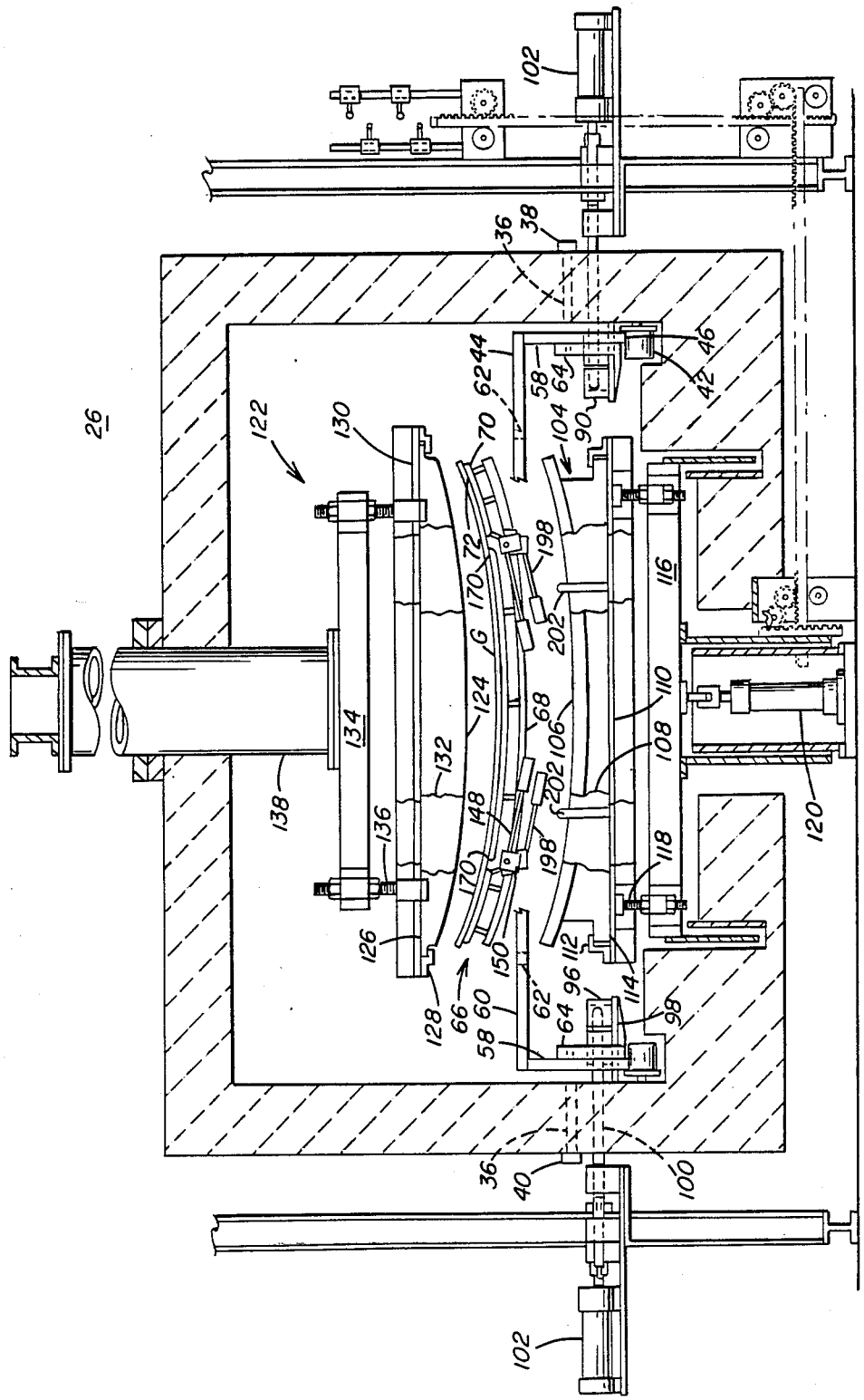
FIG. 2 is a view taken along the line 2—2 of FIG. 1, showing a transverse elevation of a press bending station incorporated in the lehr arrangement including an upper and lower pressing mold and an outline mold, with the lower pressing mold depicted in its lowered position.

Opposite side walls of the lehr at the shaping station 26 are provided with aligned tubes 36 forming part of an optical inspection system as shown in FIG. 2. Tubes 36 are aligned between a laser transmitting device 38 or other radiant energy transmitter attached to one side wall and a laser receiving device in the form of a photoelectric cell 40 or the like, attached to the opposite side wall and positioned to detect a laser beam from the transmitting device 38 which operates in a manner to be discussed later.

Figure 3:
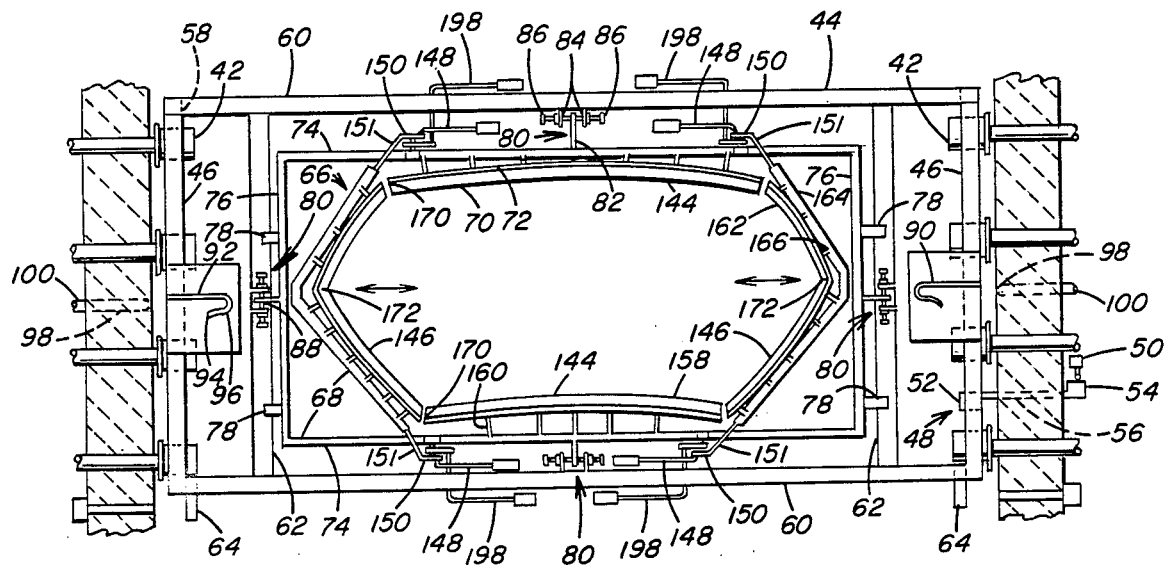
FIG. 3 is a plan view of the outline mold of the present invention, illustrating its supporting carriage and alignment means, positioned over the conveying rolls.

Referring to FIG. 3, a conveyor comprised of a plurality of stub rolls 42 deposed in transversely opposing longitudinally spaced relation extends the entire length of the lehr and defines a path of movement along a longitudinal reference line. Each stub roll 42 is mounted on a shaft that extends through a side wall of the lehr and is connected to a conveyor drive means (not shown). A mold return conveyor (not shown) extends along the entire lehr. The conveyor may be divided into a number of sections, driven from its own drive means through conventional drive rod and gear means or chain drives or the conveyor sections may be driven from a common drive through clutches in a manner well known in the art. The longitudinal reference line is preferably the longitudinal center line of the conveyor and the lehr, but may be one that is parallel thereto.

A plurality of molds support carriages 44, one only shown in FIGS. 2 and 3, each comprising a pair of stub rolls support rails 46 that extend transversely at each end of the carriage 44, is conveyed along the conveyor by rotational engagement of the stub rolls 42 with the rails 46. Referring to FIG. 3, a rotatable trip 48 for actuating a limit switch 50 is located between adjacent stub rolls 42 in the press bending station 26. The trip 48 comprises a small inner tab 52 and a large outer tab 54 rigidly mounted on a pivot rod 56 that extends through a side wall of the press bending station 26. One of the rails 46 move along a path to engage the rotatable trip 48. Normally, the large outer tab 54 causes the pivot rod 56 to rotate into a position where the small inner tab 52 is oriented vertically upward and the large outer tab 54 is oriented vertically downward out of engagement with the limited switch 50. The latter is located on the outside surface of the side wall of the lehr for ease of access.

With continued reference to FIG. 3, when carriage rail 46 engages the trip 48 it causes the small inner tab 48 to rotate to a horizontal orientation in the downstream direction of movement of the carriage 44 so that the large outer tab 54 rotates into a horizontal orientation in the upstream direction to actuate the limit switch 50. The latter remains engaged until the carriage rail 46 passes beyond the position occupied by the small inner tab 52. At this time, the large outer tab 54 rotates into a vertically downward orientation to raise the small inner tab 52 into a position for engagement by a rail 46 of the next carriage 44.

Referring to FIGS. 2 and 3, uprights 58 connect the rails 46 to a pair of upper horizontal longitudinal rails 60. A pair of upper transverse rails 62 interconnect the upper horizontal longitudinal rails 60 of the carriage 44.

Each upright 58 along one longitudinal side edge of the carriage 44 is provided with aperture plate 64. The apertures in the plates 64 are arranged to be aligned between the laser transmitting device 38 and the laser receiving device 40, whenever the carriage 44 is orientated aligned and positioned correctly within the press bending station 26.

An outline mold 66 and support frame 68 which will be discussed later in more detail are mounted on the carriage 44. The mold 66 includes shaping rail member 70 with a supporting surface 72 that conforms in elevation and outline to the longitudinal and transverse elevational shape desired for a glass sheet G to be bent slightly inboard of the glass sheet perimeter.

Support frame 68 includes longitudinally extending bars 74 and transversely extending bars 76 which support the mold 66 as shown in FIG. 3. Arms 78 extend from bars 76 and rest on the upper transverse rail 62 to slidably support the frame 68 and mold 66 on the carriage 44.

A mold position alignment means 80 may be used to adjustably position the frame 68 on the carriage 44. Although not limited in the present invention, in a particular embodiment shown in FIG. 3, a finger 82 extending longitudinally of the longitudinal reference line from each bar 74 of the frame 68 is adjustably mounted longitudinally of each upper horizontal longitudinal rail 60 through the position adjustment means 80. Each means 80 includes a pair of finger like brackets 84 fixed to each rail 60, each bracket adopted to receive a set screw 86. The inner ends of the set screws 86 engage the opposition surfaces of the finger 82 to adjust the position of the latter relative to the length of the rail 60. Lock nuts (not shown) lock the set screws 86 against the brackets 84 to lock the position of the finger 82. Horizontally extending fingers 88 that extend transversely of the longitudinal reference line from bars 76 are similarly attached relative to the upper transverse rail 62. Four positional alignment means 80 are shown, in FIG. 3, one for each rail 60 and 62, to comprise the outline mold alignment means. Each of the four position adjusting means 80 is adjusted and locked into position so that the geometric center of the outline mold 66 is located at the intersection of the line connecting longitudinally extending finger 82 with a line connecting transversely extending fingers 88. Fingers 82 and 88 are provided with a sliding fit between set screws 86 to allow different thermal expansion without displacing the geometric center of the outline mold 66 while avoiding distorting the outline mold 66 in either plan outline or elevation.

Referring now to FIGS. 2 and 3 each rail 46 supports a small horizontal platform on which is mounted a a J-shaped wall member 90. The latter has a long leg 92, a short leg 94 and a connecting closed end 96. The legs 92 and 94 extend transversely of the length of the longitudinal reference line. The closed end 96 is at the transversely inner end of the J-shaped wall member 90 and is adapted to be engaged by a pin 98 at the end of a piston rod 100. The latter extends from a piston cylinder 102 carried by a housing mounted on the lehr support structure. The piston rod 100 has an enlarged head adapted to engage limit switches (not shown) during movement thereof. The J-shaped wall members 90 serve as pin engaging members.

Returning to FIG. 2, the press bending station 26 comprises a lower pressing mold 104 that includes an upper ceramic press face 106 whose upper surface covers a continuous area corresponding to the final curved shape of a major portion of the glass sheets. The ceramic press face 106 is provided with a flexible fabric material cover 108 that does not mar a hot sheet, e.g., fiber glass cloth.

The ceramic press face 106 rests on a metal plate 110. If desired, Z-bars 112 are provided to secure a lower flange 114 of the press face 106 against the metal plate 110 while permitting differential thermal expansion therebetween. The lower mold 104 is preferable positioned on the plate 110 such that the mold member 104 maintains its geometric center along a fixed vertical axis that intersects the geometric center of the press bending station 26 throughout the pressing operation. For example, the lower mold 104 can be mounted via a slot and pin arrangement (not shown) similar to that disclosed in U.S. Pat. No. 4,265,650 which teachings are hereby incorporated by reference. In addition, alignment of the positions of the fingers 82 and 88 is made to align the geometric center of the outline mold 66 with the fixed vertical axis, when the outline mold 66 occupies an operating position at the press bending station 26.

Referring to FIG. 2, the metal plate 110 is connected to a lower frame 116 by vertical adjustment means 118, for example adjusting screws. A lower piston 120, which is adapted to move vertically parallel to the fixed vertical axis that intersects the geometric center of the press face 106 of the lower pressing mold 104, is connected to the lower frame 116 to raise and lower the lower pressing mold 104 in a vertical direction to positions adjusted by the stroke of the lower piston 120 and the adjustment of the vertical adjusted means 118. When the lower piston 120 moves the lower pressing mold 104, the geometric center of the press face 106 moves along the fixed vertical axis at the geometric center at the press bending station 26.

With continued reference to FIG. 2, the press bending station 26 also includes an upper press bending mold 122 comprising a lower ceramic press face 124 that defines a downwardly facing shaping surface that is complementary to the upwardly facing shaping surface defined by the ceramic press face 106 of the lower pressing mold 104. The upper pressing mold 122 is supported in a position, such that the geometric center of its lower ceramic press face 124 is intersected by the vertical axis of movement for the geometric center of the upper ceramic press face 106 of the lower pressing mold 104, so that the downwardly facing shaping surface defined by the press face 124 is orientated and aligned over the upwardly facing shaping surface defined by press face 106.

Figure 4:
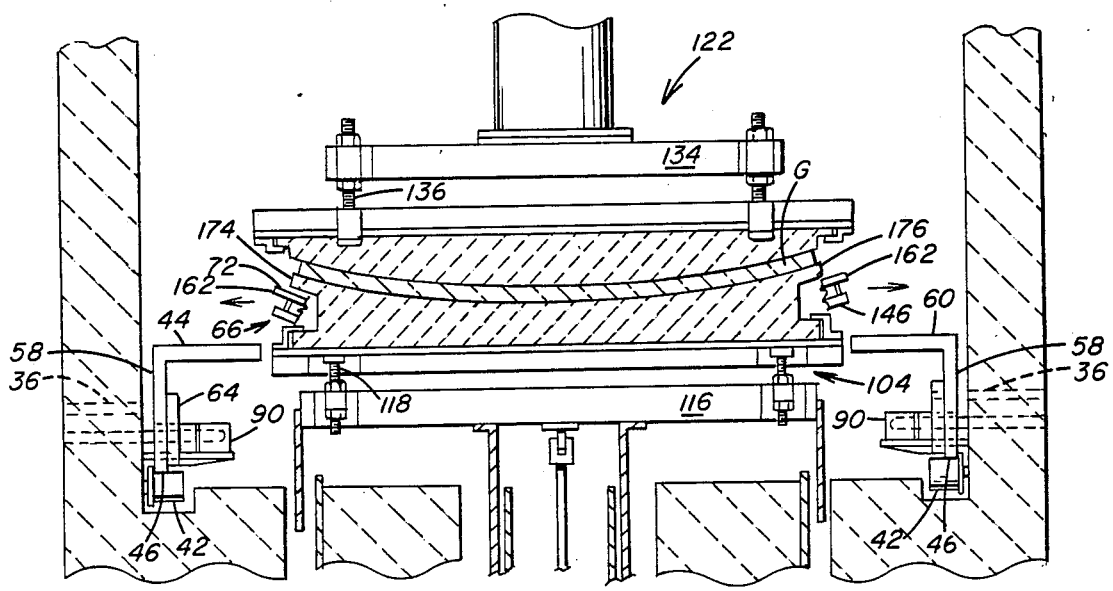
FIG. 4 is a view similar to FIG. 2 showing the lower pressing mold in a raised position such that the glass sheet is sandwiched between the lower and upper pressing molds and the outline mold in an expanded configuration, with portions omitted for clarity.

The ceramic press face 124 may be supported in any convenient fashion well known in the art. In the particular embodiment illustrated in FIGS. 2 and 4, the ceramic press face 124 has an upper flange 126 that is supported by Z-bars 128 secured to a metal plate 130 to provide a ledge to support the upper flange 126, while permitting relative horizontal sliding due to differences in thermal expansion. In addition, a slot and pin arrangement (not shown) similar to that disclosed for the lower mold 90 may be used to position the upper mold 122 on the plate 130 and maintain its aligned orientation with the lower pressing mold 106 despite changes in temperature that occur during operation.

A mold cover 132 of a material similar to that provided for the lower pressing mold 104 may also be provided for the upper pressing mold 122. The mold cover 132 for the upper pressing mold stretches around the upper pressing mold 122 and against the downwardly facing shaping surface defined by press face 124, and is suitably clipped to the marginal portion of the plate 130 that extends beyond the upper press face 124.

An upper metal frame 134 is adjustably secured to the metal plate 130 through a vertical adjustment means 136 which may be similar in construction to the vertical adjustment means 118. A vertical column 138, supported from an overhead support structure and adjustable by screwjacks (not shown) is used to hold the upper pressing mold 122 in a desired position.

It would be obvious to one skilled in the art that the upper pressing mold 122 may be replaced with an upper vacuum mold. Although not limiting in the present invention, the vacuum mold may be similar to those taught in U.S. Pat. No. 4,579,577 to Claassen or U.S. Pat. No. 4,526,605 to Frank et al, which teachings are hereby incorporated by reference. The use of an upper vacuum mold offers certain advantages as will be discussed later.

Access to the press bending station 26 is provided by a slide door 140 (FIG. 1a). Lifting and lowering means 142 is provided to open and close the slide door 140 when access to the press bending station is needed.

Although not limiting in the present invention the mold 66 illustrated in FIGS. 2 and 3 is an articulating shaping mold. Referring specifically to FIG. 3, mold 66 includes a stationary central portion 144 and a pair of opposed pivoting end mold wing sections 146 similar to that disclosed in U.S. Pat. No. 4,597,789 to Reese, which teachings are herein incorporated by reference. The mold 66 is supported on a reinforcing frame 68 which is positioned on carriage 46.

Figure 5:
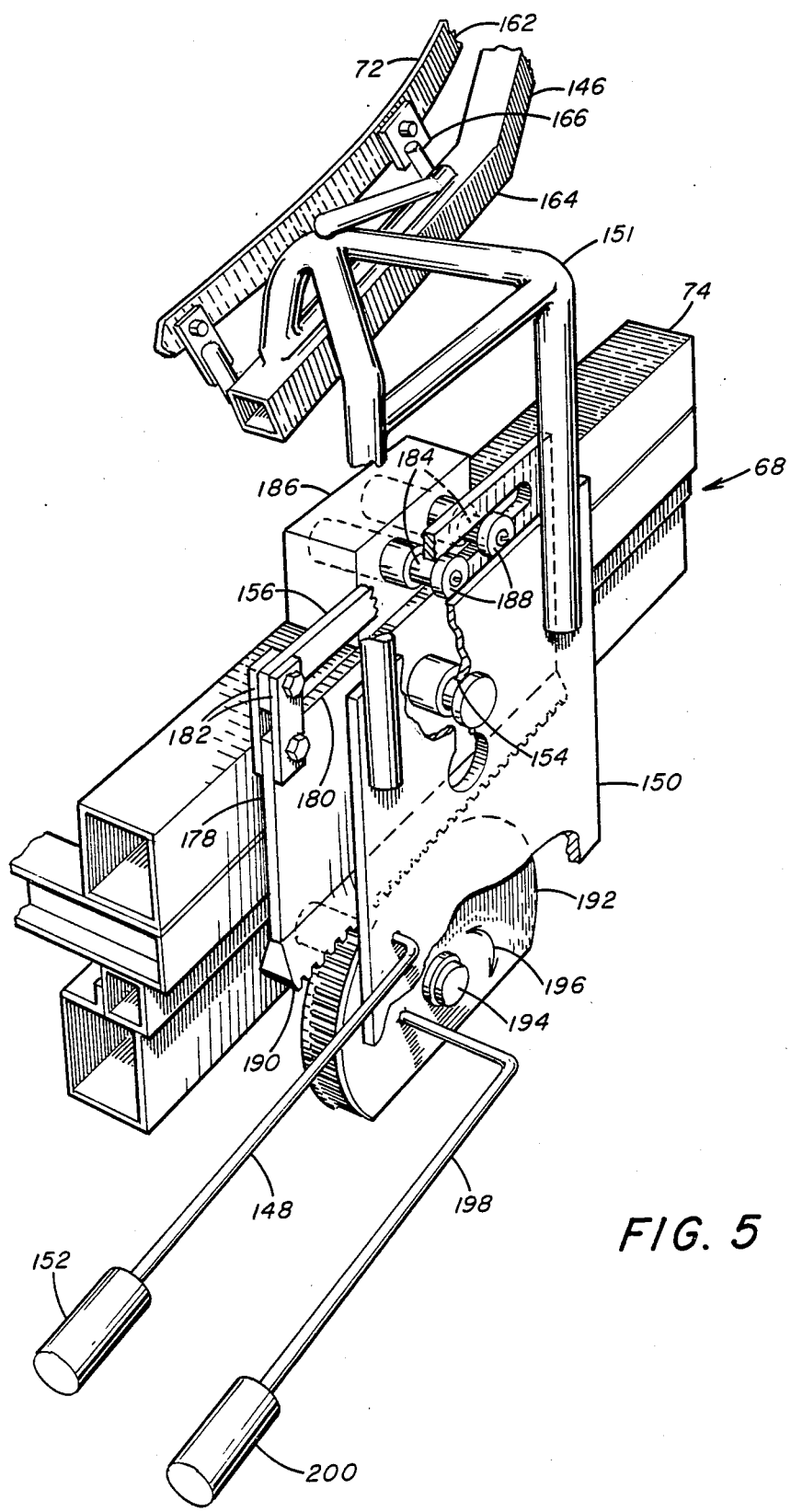
FIG. 5 is an isometric projection of the outline mold pivoting and expanding mechanism, with portions omitted for clarity.

Referring to FIGS. 3 and 5, each lever arm 148 is fixed to reinforcing plate 150 which is attached through framing 151 to pivoting wing section 146. The lever arms 148 are positioned laterally outside of the rail members 70 and are provided with counterweights 152 at the longitudinally inward extremities. The reinforcing plate 150 is pivotally engaged through pin 154 to sliding mount 156 as will be discussed later. The counterweights 152 rotate the wing sections 146 about the pin 154 from an open mold position (not shown) wherein the glass sheet is supported in a flat, rigid configuration, to a closed mold position as shown in FIG. 2 when the glass sheet is in a heat softened conditioned.

The rail member 70 of the mold 66 includes a central shaping rail 158 supported from bar 74 by tabs 160 in the central mold portion 144, and an end mold shaping rail 162 supported from reinforcing bar 164 by tabs 166 at each end mold wing section 146. Reinforcing bar 164 in each wing section 146 is pivotally mounted on frame 68 through framing 148 and reinforcing plate 150. When the wing section 146 is in its pivoted upright and closed position as shown in FIG. 2, the elevational contour of supporting surface 72 of the shaping rail member 70 which includes the rails 158 and 162 defines the final desired contour of the shaped glass sheet slightly inboard of the glass sheet perimeter. Although not limited in the present invention, the rail 70 is preferably made of stainless steel.

The ends of the shaping rails 158 of the central mold portion 144 which extend to shaping rails 162 are commonly referred to as the cut point 170 as shown in FIGS. 2 and 3. When flat glass sheets are mounted on the mold 66 for bending, the end mold wing sections 146 are rotated downward so that a flat glass sheet is supported at its longitudinal extremities on wing portion 146 at corner portions 172 and intermediates extremities at cut points 170. When the glass sheet G is softened by application of heat as the mold 66 moves through bending lehr and it begins to sag, the counterweight 152 rotates the plate 150 thus rotating the end mold wing section 146 upward and inward into the closed position to form a substantially continuous shaping rail 70.

As discussed supra, in-lehr press bending previously required that the upper ceramic press face 106 of the lower pressing mold 104 have an outline slightly smaller than the outline mold 66, so that the lower mold 104 may move upward and pass through the shaping rail members 70. As a result, the peripheral edge of the glass sheets are not pressed between the lower mold 104 and the upper mold 122. As shaped glass sheets become more complex, it is becoming increasingly more important to ensure that the glass sheet be precisely shaped over the entire surface. In particular, it is especially important in glass sheet configurations having a deep wrap along its outer edge portions and/or where the curvature must be continued through the edge of the glass sheet to be shaped. This can be done by pressing the major surfaces of the glass sheat including critical portions of its peripheral edge between the upper and lower molds. At present, this pressing arrangement is not possible since the mold 104 must fit within outline mold 66. In the particular embodiment of the invention illustrated in FIGS. 2 and 4, end portions 174 and 176 of the press face 106 extend beyond the peripheral edge of the glass sheet G so as to press the corresponding glass sheet edge between the upper and lower molds. In order to avoid interference between the end portions 174 and 176 of press face 106 and shaping rails 162 of wing sections 146, the shaping mold 66 in the present invention is expandable so as to allow for this type of press bending operation i.e., pressing out to the edge of the glass sheet at critical areas of the glass sheet periphery.

Referring to FIGS. 5 through 8, reinforcing plate 150 is pivotally secured to sliding mount 156 which includes a plate 178 with an open ended slot 180. Closure plates 182 may be secured to the plate 178 to close the open end of the slot 180. Spaced apart posts 184 extend from a post mount 186, which is sacured through member 74 to frame 68, through the slot 180 of the sliding mount 156. The posts 184 are positioned within the elongated slot 180 such that the sliding mount 156 may slide horizontally along the post 184 in a direction as indicated by arrow 186 (shown in FIGS. 6 and 7 only). Posts 184 may include a cap member 188 to capture the sliding mount 156 between the cap member 188 and post mount 186.

Gear rack 190 is secured along the lower edge of the sliding mount 156. Gear 192, rotatably mounted to the frame 68 about pin 194, engages the gear rack 190 such that rotation of the gear 192 about the pin 194 in the direction indicated by arrow 196 results in lateral translation of the sliding mount 156 along the post 184 in the direction indicated by the arrow 187. Lever arms 198 positioned laterally outward from the lever arms 148 extend from the gear 192 and include a counterweight 200. With reference to FIG. 2, adjustable post members 202 are mounted on the frame 116 of the lower pressing mold 104, and are aligned with the lever arm 198 such as that lower mold 104 moves upward through the outline mold 66, posts 202 contact and lift lever arms 198 which in turn rotate the gear 192 and move the sliding mount 156 and wing section portions 146 attached thereto outward relative to the central portion 144 i.e., to the right as shown in FIGS. 5 and 6. As the lower mold 104 moves downward, the lever arms 198 and gear 192 rotates back to this original position and the outline mold 66 contracts to its original configuration i.e., wing sections 146 move to the left as shown in FIG. 6. If required, guide means (not shown) may be secured to plate 150 so as to ensure that the sliding mount 156 moves in the proper direction to expand and contract the outline mold 66.

The embodiment of the invention described, supra, is particularly applicable to shaping glass sheets wherein the edge contours of the glass sheet to be bent at its outer longitudinal wing sections are critical. The lower mold 104 includes a shaping surface 106 that extends beyond the peripheral edge of the glass sheet at these critical areas and the mold 66 is constructed to allow the mold 104 to pass therethrough without interference. It would be obvious to one skilled in the art that the teachings of the present invention may be incorporated into an outline mold that expands in an opposite direction, i.e., a transverse direction, or an outline mold that expands in any direction necessary to allow a lower press face to pass therethrough so as to press critical edge portions of the glass sheet against an upper press face.

Cycle of Operation

The operating sequence for the bending lehr as described supra, is similar to that disclosed in U.S. Pat. No. 4,265,650 to Reese, which teachings are herein incorporated by reference. A pair of glass sheets of curved outline and with suitable parting material therebetween is positioned in a substantially horizontal orientation on an outline mold 66 of the mold supporting carriage 44 at the loading zone 20. The carriage 44 is transversely aligned relative to a longitudinal reference line through the lehr by positioning of the rails 46 on the stub rolls 42. The carriage 44 passes through the heating zone 22 of the lehr where heating elements are arranged to provide a pattern of heating both longitudinally and transversely of the path of travel for the glass laiden mold 66 through the lehr. By the time the mold arrives at the gravity bending station 24 (maintained at an ambient temperature range of 1150° F. to 1180° F. [621° C. to 638° C.]) the glass sheets have been heated to their deformation temperature (between 1080° F. and 1170° F. [582° C. to 632° C.]) and sag to a preliminary configuration. In addition, counterweights 152 pivot plate 150 to rotate wing section 146 into a closed position.

During passage of the outline mold 66 from the loading zone 20 to the press bending station 26, it may lose its approximately proper alignment in orientation with respect to the longitudinal reference line. However, because the glass sheets have non-rectangular outlines of nonconform curvature in plan and are bent to complicated shapes, it is essential that the shapes be oriented and aligned exactly when they arrive at the press bending station 26. It is also important that the outline mold be properly aligned above the lower pressing mold 104 to avoid mold damage. The apertured plates 64 mounted on the carriage 44 intercept the laser beam when the carriage 44 is improperly placed or misorientated at the press bending station 26 to stop further operation until the apertures in both plates 64 are in the path of the laser beam.

At this time the lower pressing mold 104 is in a lowered position to provide clearance for the passage of the carriage 44 into the press bending station 26. Also, the pins 98, which are retracted to their outward position to allow the J-shaped wall member 90·of the previous carriage to pass through the press bending station 26, are actuated when the carriage rail 44 engages trip 48 and rotates inner tab 52 and outer tab 54 in unison to energized limited switch 50. The latter actuates piston cylinder 102 to move the pins 98 into immediate positions where the short legs 94 clear the pins 98, but the long legs 92 engage the pins 98 thereby stopping further movement of the carriage 44. At this time, the geometric center of the glass is aligned with a transverse reference line, but may not be align with longitudinal reference line. When the pins 98 are in their immediate positions, limit switches are actuate to start a first timer that stops further rotation of the conveyor rolls 42 at the shaping station 26. A second timer is initiated to temporarily stop further inward movement of piston rods 100 and, after an adjustable time delay for the rolls to stop rotating, permit the rods 100 to move to their fully extended position such that the pins 98 abut the inner ends 96 of the J-shaped wall member 90. The fully extended pins 98 center the carriage 44 and its supported outline molds 66, so that the geometric center of the outline mold 66 is aligned vertically with a geometric center of the upper pressing mold 122 and of the lower pressing mold 104.

The pressing molds 104 and 122 are maintained at a designated elevated temperature in the press bending station 26. Elevated mold temperatures enhance the ability of the pressing molds to complete the shaping of the glass and reduce the likelihood of chill cracking in the glass, a phenomenon associated with colder molds. The pressing molds are at an elevated temperature that approximates the ambient temperature in the press bending station 26.

After mold 66 with the glass sheets supported thereon is aligned, lower piston 120 moves the lower pressing mold 104 to lift the glass sheet off the outline mold 66 and support the glass sheet during its engagement with the upper pressing mold 122. As the lower mold 104 rises, posts 202 on frame 116 engage lever arms 198 and began to rotate gears 192, moving wing sections 144 outward while the central shaping rail supports the glass sheet. Since the wing sections 146 move horizontally outward there is no scuffing or sliding of the glass sheet by the wing section rails 162 while the glass sheet is supported on the central shaping rail 158. After the wing sections 146 are fully retracted the upper pressing surface 106 of the lower pressing mold 104 engages the lower major surface of the glass sheet. It should be noted that wing sections 146 must be fully retracted prior to engagement of the glass sheet by the mold 104 since there is an interferring overlap between where rail 162 supports the glass sheet and where press face 106 contacts and lifts the glass sheet. The height of post 202 may be adjusted so to control the proper coordinated movement between the lower mold 104 and the wing sections 146.

When piston 120 is fully extended, a timer (not shown) is actuated to hold the pressing molds against the opposite outer major surfaces of the pair of glass sheets to ensure the imposition of the desired curved configuration and in particular to ensure a proper configuration of the critical edge portions of the glass sheet. The timer also controls the start of the return of the lower pressing mold 104 to its lower position.

After pressing and shaping the glass sheet between the molds 104 and 122, the lower pressing mold 104 moves downward with the shaped glass sheet supported thereon. For the reasons discussed previously, the lower mold 109 must disengage from the glass sheet prior to the wing sections 146 moving inward to support the glass sheet so that there will be no interference between the wing section rail 162 and the end section 174 and 176 of the press face 106 of the mold 104. As the mold 104 lowers, it passes between the central shaping rails 158 while wing sections 146 are still in their expanded position so that the shaped glass sheet is momentarily supported only on the central rails 158 prior to the wing section 146 moving inward to their original position. As the mold 104 continues to lower, post 202 allows the lever arms 198 to rerotate to their original positions and retract the wing sections 146.

When lower mold 104 is fully lowered, pins 98 are retracted and the lehr door 30 opens. The fully retracted pins 98 engage additional limits switches (not shown) that actuate the running of the conveyor rolls 42. The shaped glass sheet and mold 66 are conveyed out of the shaping station 26 into the annealing zone 28 and the door 30 is closed for next bending and shaping cycle.

Once the glass sheets have been shaped in the pressing station 26, it is necessary that they retain their conforming shapes in the annealing zone 28 until cooled from the deformation temperature range of approximately 1080° F. to 1170° F. (582° C. to 632° C.) to below the strain point of the glass, which for float glass is approximately 950° F. (510° C.). To ensure conformance of the glass sheets to the desired shapes, it is essential that they be cooled at a slow rate of cooling to below the strain point. The maximum rate of cooling that avoids excessive permanent warpage between the glass sheet depends upon the glass sheet thickness. After annealing, the glass sheets pass into the cooling zone 32 for additional cooling.

As noted supra, upper pressing mold 122 may be a vacuum mold (not shown). With respect to the operating cycle, the glass sheets would be conveyed through the lehr, positioned at the shaping station 26 and pressed between the upper mold 122 and lower mold 104 as previously discussed. The use of a upper vacuum press would help in forming the glass sheets by drawing the glass against its shaping surface by vacuum. After shaping, the lower mold 104 would be lowered, while the shaped glass sheets would remain held against the upper vacuum mold. In the case of simultaneously shaping two or more glass sheets, the vacuum press will hold both glass sheets for a limited period of time as taught in U.S. Pat. No. 4,661,139 to Reese et al., which teachings are herein incorporated by reference. The glass sheets would then be deposited by the upper vacuum mold onto the mold 66 after the lower mold 104 has moved below the central shaping rails 158 and wing sections 144 have returned to their original position. The mold 66 would then exit the shaping station 26 and enter the annealing zone 28 and cooling zone 32 where it is cooled, as described supra.

In addition, the upper vacuum mold may also help during shaping by holding the glass sheet against its shaping surface while the lower mold is lowered, allowing the mold 66 to contract and assume its original configuration while the shaped glass sheet is held by upper mold 122. In this fashion, the shaped glass sheets are deposited on the mold 66 such that the entire peripheral portion of the glass sheet is supported by shaping rails 70 immediately upon depositing the glass sheets on the mold 66.

While the specific embodiment of the invention described herein includes an outline mold in combination with the upper and lower pressing mold at the press bending station 26 it is recognized that for bending one or more sheets of thin glass sheets (individual thicknesses exceeding 3 millimeters [0.120 inches]) to less complicated shapes wherein the edge portions still needs to be shaped by a shaping means, the outline mold 66 as described in the present invention may be used with the vertically moveable lower pressing mold in the absence of an upper pressing mold. In such an arrangement, the glass sheets are transferred from the outline mold 66, which supports the periphery of the glass sheet to the vertically moveable lower mold which supports the glass sheet substantially throughout its entire lower major surface and at least to the edge of the glass sheet at predetermine critical edge portions. The lower mold will control any uncontrolled sag in the glass sheet as it lifts the glass off the outline mold and allows the glass to conform to the upwardly facing shaping surface of the vertically moveable mold by combination of inertial and gravity bending. If necessary, the lower mold may be a vacuum mold so as to draw the heat softened glass thereagainst and further ensure conformance of the glass sheet to the lower mold shaping surface.

Although the present invention describes an expandable outline shaping mold with articulating end portions that are horizontally moveable in response to the pivoting action of a counterweighted arm member, it would be obvious to one skilled in the art that the wing sections 146 may be moved by other equally effective arrangements. For example, plate 178 of sliding mount 156 may be positioned on a rail and moved automatically thereafter a motor in response to the vertical movement of lower mold 122. As an alternative, a drive may replace lever arm 198 and counterweight 200 to engage and rotate gear 192. Limit switches (not shown) responsive to the movement of the lower mold 122 would actuate the drives to expand the outline mold 66.

The form of the invention shown and described in this disclosure represents an illustrative embodiment thereof. It is understood that various changes may be made without departing from the teachings of the invention defined by the claimed subject matter which follows.

We claim:

1. An outline bending mold for shaping heat softened sheet material comprising;
   a first rail portion having an elevational contour to support a first portion of said sheet inboard of the sheet perimeter;
   a second rail portion having an elevational contour to support a second portion of said sheet inboard of the sheet perimeter;
   a support frame to support said first and second rail portions; and
   means to move said second rail portion horizontally along said frame relative to said first rail portion from a first position wherein said second rail portion is inboard of the sheet perimeter to a second position wherein said second rail portion is outboard of said sheet perimeter.

2. The outline mold as in claim 1 wherein said second rail portion includes support means slidably mounted on said frame relative to said first rail portion.

3. The outline mold as in claim 2 wherein said outline mold is articulating outline mold and said second rail portion is pivotally mounted on said frame relative to said first rail portion.

4. An apparatus for shaping a sheet of material to a predetermined shape comprising;
   an outline sheet supporting mold having first and second rail portions with sheet engaging surfaces corresponding to the desired shape and elevational contour of said sheet inboard of the sheet perimeter;
   means to heat said sheet to its heat softening temperature;
   a lower shaping mold having a full surface press face with a press face outline having a first portion slightly smaller than a plan outline of said outline mold and selected second portions extending beyond said plan outline of said outline mold;
   means to separate said first rail portion relative to said second rail portion; and
   means to raise said lower mold relative to said outline mold such that said press face of said lower mold moves vertically through said separated outline mold.

5. The apparatus as in claim 4 further including means responsive to the vertical movement of said lower mold to actuate said separating means.

6. The apparatus as in claim 5 wherein said selected second portions of said press face outline extend at least to the perimeter of said sheet.

7. The apparatus as in claim 6 wherein said separating means includes a sliding frame supporting said second rail portion.

8. The apparatus as in claim 7 further including an upper shaping mold vertically aligned with said lower shaping mold and having a pressing surface complementing the pressing surface of said lower shaping mold.

9. The apparatus as in claim 8 further including means to draw a vacuum through said pressing surface of said upper shaping mold.

10. The apparatus as in claim 8 further including means to align said outline mold between said upper and lower shaping molds.

11. The apparatus as in claim 10 wherein said heating means includes an elongated heating lehr and further including a carriage to support said outline mold and means to convey said carriage through said lehr.

12. The apparatus is in claim 11 further including means to pivot said second rail portions relative to said first rail portion about a generally horizontally extending axis.

13. The apparatus as in claim 12 wherein said sheet material is a glass sheet.

14. The apparatus as in claim 7 further including means to pivot said second rail portion relative to said first rail portion about a generally horizontally extending axis.

15. The apparatus as in claim 14 wherein said outline mold includes a central portion and wing portions extending from opposing ends of said central portion wherein said central portion is first rail portion and said wing portions are said second rail portion.

16. A method of shaping heat softenable sheet material comprising;
   supporting said sheet on an outline mold having a shaping rail with plan outline corresponding to the shape of said glass sheet and having an upper shaping surface corresponding to the elevational contour of said sheet slightly inboard of said sheet perimeter;
   heating said sheet to its heat softening temperature so as to allow said sheet to gravity sag into substantial conformance with shaping surface of said outline mold;
   positioning said outline mold above a shaping mold with a full surface press face having a first outline portion slightly smaller than the plan outline of said outline mold and selected second outline portions extending beyond the plan outline of said outline mold;
   moving selected portions of said shaping rail vertically aligned with said selected second outline portions of said shaping mold outwardly relative to said outline mold so as to expand said outline mold; and
   raising said shaping mold relative to said outline mold such that said shaping mold press face passes through said shaping rail to lift said sheet from said upper shaping surface of said shaping rail and shape said sheet.

17. The method as in claim 16 including the step of maintaining said outline mold in said expanded configuration while said shaping mold lifts and shapes said sheet.

18. The method as in claim 17 further including the steps of lowering said shaping mold relative to said outline mold so as to pass therethrough and moving said selected portions of a said shaping rail inwardly relative to said outline mold such that said outline mold assumes its original configuration and said shaped sheet is supported by said shaping rail.

19. The method as in claim 16 further including the step of drawing a vacuum through said shaping mold to conform said sheet to said shaping mold press face.

20. The method as in claim 16 wherein said shaping mold is a lower shaping mold and further including the step of pressing said sheet between said lower mold and a vertically aligned full surface upper shaping mold.

21. The method as in claim 20 further including the step of drawing a vacuum through said upper shaping mold to hold said sheet thereagainst while lowering said lower shaping mold through said outline mold.

22. The method as in claim 21 further including the step of terminating said vacuum in said upper shaping mold to deposit said shaped sheet on said shaping rail of said outline mold.

* * * * *